: 2,794,004
Patented May 28, 1957

2,794,004
WETTING AGENTS AND A PROCESS OF MAKING SAME

Roger Ratti, Binningen, near Basel, Switzerland, assignor to Durand & Huguenin A. G., Basel, Switzerland, a Swiss company No Drawing. Application October 13, 1953,
Serial No. 385,897

Claims priority, application Switzerland April 13, 1949

17 Claims. (Cl. 252—353)

This application is a continuation-in-part application of copending Ser. No. 155,127, filed April 10, 1950, now abandoned.

The present invention relates to wetting agents comprising a mixture consisting of at least one water soluble anionic surface active substance, selected from the group consisting of water soluble salts of alkyl-aryl-sulfonic acids, water soluble salts of sulfonic acids of esters of organic polycarboxylic acids, water soluble salts of acidic esters of sulfuric acid with high molecular alcohols, water soluble salts of condensation products of high molecular fatty acids containing sulfonic groups, and at least one substantially water insoluble neutral triester of phosphoric acid, selected from the group consisting of trialkyl phosphates and trialkoxyalkyl phosphates, the alkyl radicals of which contain 3 to 8 carbon atoms inclusive and the quantity of phosphoric acid triester present amounting to 10 to 40% by weight relative to the surface active substance.

More especially the invention relates to wetting agents comprising a mixture consisting of at least one water soluble salt of an alkyl-aryl-sulfonic acid and at least one substantially water insoluble neutral triester of phosphoric acid as defined above.

Furthermore especially the invention relates to wetting agents comprising a mixture consisting of at least one water soluble salt of an alkyl-aryl-mono-sulfonic acid and at least one substantially water-insoluble neutral triester of phosphoric acid as defined above.

Owing to the simultaneous presence of the surface active substances and of the trialkyl phosphate or trialkoxyalkyl phosphate an extremely strong wetting power is obtained on all kinds of fibres which is markedly superior to the wetting power of the single ingredients. The increase of the wetting power, which is caused by increasing quantities of the neutral triester of phosphoric acid occurs the sooner and the more, the smaller the wetting power of the surface-active substance used is per se. In practice, it is, however, expedient to use at least 10% of a neutral triester of phosphoric acid, based on the weight of the surface-active substance, for with smaller quantities the increase of the wetting power compared to the quantity of the neutral triester of the phosphoric acid used is generally too small. The practically most interesting results are obtained if, according to the wetting power of the surface-active substance used, between 10 and 40% by weight of neutral triester of phosphoric acid are used. A further increase of the quantity of phosphate over 40% is generally not profitable, since the increase in cost caused by the large quantity of phosphate is no longer compensated by the increase in wetting power. By adding a trialkyl phosphate or trialkoxyalkyl phosphate within the above defined limits, it is possible to increase considerably the wetting power of a given surface-active substance in an economical way.

The substantially water-insoluble trialkyl or trialkoxyalkyl esters of the phosphoric acid which may be used according to the present invention may contain three identical alkyl or alkoxyalkyl radicals or also different alkyl or alkoxyalkyl radicals. A particularly good wetting power is obtained by using esters of phosphoric acid with aliphatic alcohols containing 3 to 8 carbon atoms, the alkyl radicals of the latter being straight or branched chains. Especially good results are obtained with trialkoxy-alkyl phosphates, i. e. trialkylphosphates in which the carbon chain of the alkyl radical is interrupted by ether-like linked oxygen atoms. Moreover, it is also possible to use mixtures of different trialkyl and mixtures of different trialkoxyalkyl phosphates as well as mixtures of trialkyl-phosphates and trialkoxyalkylphosphates. Examples of trialkyl phosphates which may be employed are: tripropyl phosphate, tri-isopropyl phosphate, tri-n-butyl phosphate and isomeric derivatives thereof, tri-n-amyl phosphate and isomeric derivatives thereof, tri-n-octyl phosphate, tri-2-ethylhexyl phosphate and isomeric tri-octyl phosphates or the like, while tributoxy-ethyl phosphate is a particularly suitable example of a trialkoxy-alkyl phosphate.

As water-soluble surface-active substances for the manufacture of the new wetting agents, there may be used substances which belong to chemically different classes of anionic surface active substances. More particularly anionic surface-active substances which are known as wetting agents may be used.

As water-soluble anionic surface-active substances which may be used acording to the present invention, there are mentioned, by way of example, only:

Salts of alkyl-aryl-sulfonic acids, especially salts of the monosulfonic acids of dodecylbenzene, dodecyltoluene, di-propyl- and di-isopropyl-naphthalene, di-butyl- and di-isobutyl-naphthalene, amyl-naphthalene, di-amyl-naphthalene, nonylnaphthalene, di-nonylnaphthalene or the like, salts of sulfonic acids of esters derived from organic polycarboxylic acids, especially salts of sulfosuccinic acid esters, sulfophathalic acid esters and the like, salts of acidic esters of sulfuric acid derived from high molecular alcohols, like lauryl alcohol sulfate, cetyl alcohol sulfate and so on, salts of condensation products of high molecular fatty acids containing sulfonic groups, especially esters and amides of high molecular fatty acids containing a sulfo group, an imidazol derivative containing an aliphatic long chain radical and a sulfo group.

The degree of dispersity of the substantially water-insoluble trialkyl or trialkoxyalkyl phosphates depends on the nature of the water-soluble surface-active substance used. If the trialkyl phosphate is mixed with the salt of an alkyl-aryl-sulfonic acid, or with the salt of another surface-active substance as described above, a hydrotropic solution of the water-insoluble trialkyl phosphate is obtained on dissolving this mixture in water; this hydrotropic solution shows an extraordinarily great wetting power.

The mixture of the surface-active substances with the trialkyl phosphates may be effected without the addition of further diluents so that solid masses can be produced. It is however also possible to work in the presence of suitable diluents, preferably of water, solutions or water-soluble pastes or honey-like masses being thus obtainable depending on the physical properties of the surface-active substance used.

The wetting agents according to the invention are suitable for producing aqueous solutions or dispersions having a high wetting power which can be used for the rapid wetting of the most different materials.

The following examples serve further to illustrate and explain the invention, but do not limit it. Parts are by weight unless otherwise stated and temperatures are in degrees centigrade. The relationship of parts by weight to parts by volume is that of kilograms to litres.

Example 1

100 parts of each of the following substances known as wetting agents were mixed, i. e.:

I. Sodium salt of di-isopropyl naphthalene sulfonic acid (containing about 25% of sodium sulfate).
II. Sodium salt of di-butyl naphthalene sulfonic acid (commercially pure, made by extraction of the raw product with benzene and evaporation of benzene).
III. Sodium salt of a mixture of alkyl-aryl-sulfonic acids, obtained by sulfonation of a commercial mixture of alkyl benzenes boiling at a temperature of 110–210° C. at 12 mm. with sulfuric acid monohydrate at 50° C. (containing sodium sulfate).
IV. Sodium salt of the acidic sulfuric acid ester of commercial lauryl alcohol in form of a high concentrated paste (Gardinol WA, strongly concentrated) and
V. Invadin N (Young and Coons, Surface Active Agents, p. 130, 1945) with:
　A. 20 parts of water and 20 parts of tri-n-butyl phosphate and
　B. with 40 parts of water until a homogeneous paste has been obtained.

To test the wetting power 1 gram and 2 grams of each of the mixtures A and B were diluted in one litre each of water.

The test of the wetting power was effected according to the sinking method with strips of 15 x 35 mm. of woolfelt or raw cotton material. The strips were completely dipped into the liquid to be tested by means of a thread of suitable length attached to them and carrying a small weight and the time between the dipping and the sinking was measured. Temperature of the liquid was 20° C. The results are shown in the following table:

|  | Sinking times | | | |
|---|---|---|---|---|
|  | Cotton | | Wool | |
|  | 1 g./litre | 2 g./litre | 1 g./litre | 2 g./litre |
|  | Seconds | Seconds | Seconds | Seconds |
| I-A | 29 | 4 | 8 | 3 |
| I-B | over 180 | 172 | over 180 | 39 |
| II-A | 8 | 1 | 4 | 1 |
| II-B | 59 | 13 | 28 | 8 |
| III-A | 6 | 1 | 5 | 2 |
| III-B | 58 | 22 | 25 | 12 |
| IV-A | 45 | 17 | 14 | 6 |
| IV-B | 166 | 74 | 76 | 42 |
| V-A | 29 | 4 | 8 | 2 |
| V-B | 55 | 32 | 28 | 16 |

As the solutions A and B contain always the same amount of wetting agent the excellent effect of the addition of tributyl phosphate can be seen from the improvement caused in the sinking times of A when compared with B. From the comparison of the sinking times resulting with 1 gram of A compared with 2 grams of B it can be gathered that also a duplication of the quantity of wetting agent present in the solution (2 grams of B per litre) has not in the least the same good effect as an addition of 20% of tributyl phosphate (1 gram of A per litre).

In the above example tri-iso-butyl phosphate, tri-isoamyl phosphate or tri-butoxyethyl phosphate can be substituted with like success for the tri-n-butyl phosphate. If the amount of the trialkyl phosphate is increased a further improvement of the wetting power is obtained.

Instead of pasting first the wetting agent with the trialkyl phosphate the wetting agent can also first be dissolved in water, whereupon the trialkyl phosphate can be added to the solution.

Example 2

530 grams of an aqueous paste of the sodium salt of the nonylnaphthalene sulfonic acid (obtained by sulfonation of a commercial nonylnaphthalene with concentrated sulfuric acid and containing about 350 parts of the sodium salt of nonylnaphthalene sulfonic acid, 110 parts of sodium sulfate and 70 parts of water) are mixed in a suitable apparatus, if desired with slight heating, with 100 parts of commercial tributyl phosphate and treated until a homogeneous viscous paste is formed.

1 gram of this paste is dissolved in 1 litre of water of 20° C. If the wetting power of this solution is tested according to the sinking method described in Example 1 sinking times of only 3–4 seconds are obtained for cotton and wool.

In this example the tributyl phosphate can be replaced with the same success by commercial tributoxyethyl phosphate.

Furthermore, the sodium salt of nonylnaphthalene sulfonic acid may be replaced by the sodium salt of the dodecyltoluene sulfonic acid, obtainable by sulfonation of commercial dodecyltoluene.

Example 3

100 grams of each of the following substances known as surface-active substances:

I. Eriopon GA (Diserens: l. c., p. 106)
II. Sandopan N (Diserens: l. c., p. 106) and
III. Ultravon W (Young and Coons, Surface-Active Agents, p. 150) are mixed with:
　A. 40 parts of water and 20 parts of tributyl phosphate and
　B. 60 parts of water.

For testing the wetting power 1 gram each and 2 grams respectively of the mixtures A and B were dissolved in 1 litre each of water and the sinking times of cotton and wool measured in these solutions at 20° C. as described in Example 1. The results are tabulated as follows:

|  | Sinking times | | | |
|---|---|---|---|---|
|  | Cotton | | Wool | |
|  | 1 g./litre | 2 g./litre | 1 g./litre | 2 g./litre |
|  | Seconds | Seconds | Seconds | Seconds |
| I-A | 57 | 22 | 12 | 5 |
| I-B | 280 | 133 | 72 | 50 |
| II-A | 29 | 7 | 8 | 4 |
| II-B | 95 | 53 | 65 | 28 |
| III-A | 86 | 49 | 16 | 6 |
| III-B | 301 | 209 | 120 | 76 |

Example 4

100 parts each of the commercial wetting agent "Nacconal NR" (Young and Coons, Surface-Active Agents, p. 135 (1945)), are mixed with:

A. 20 parts of water and 20 parts of tributyl phosphate and
B. 40 parts of water.

For testing the wetting power 1 gram each and 2 grams respectively of the mixtures A and B were dissolved in 1 litre each of water and the sinking times of cotton and wool measured in these solutions at 20° C. as described in Example 1. The obtained results are as follows:

|  | Sinking times | | | |
|---|---|---|---|---|
|  | Cotton | | Wool | |
|  | 1 g./litre | 2 g./litre | 1 g./litre | 2 g./litre |
|  | Seconds | Seconds | Seconds | Seconds |
| A | 8 | 1 | 5 | 1 |
| B | 53 | 24 | 32 | 11 |

Example 5

100 grams of each of the following commercial wetting agents:

I. Santomerse 1 (Young and Coons, Surface-Active Agents, p. 142)
II. Tergitol Penetrant 7 (Young and Coons, l. c., p. 146)
III. Teepol X (British Patent 587,279, p. 6, lines 35-42)
IV. Nekal NS (Young and Coons, l. c., p. 135)
V. Resolin B (Young and Coons, l. c., page 142) are mixed with:

A. 20 parts of water and 20 parts of tributyl phosphate and
B. 40 parts of water.

The wetting agents Nos. II and III and IV form, on adding tributyl phosphate, two layers which, by shaking, mix easily to form an unstable emulsion.

For testing the wetting power 1 gram each of the mixtures A and B was dissolved in 1 litre each of water and the sinking times of cotton and wool measured in these solutions at 20° C. as described in Example 1. The results are tabulated as follows:

|  | Sinking times | |
|---|---|---|
|  | Cotton, 1 g./litre | Wool, 1 g./litre |
|  | Seconds | Seconds |
| I-A | 7 | 4 |
| I-B | 31 | 23 |
| II-A | 9 | 5 |
| II-B | 30 | 24 |
| III-A | 34 | 10 |
| III-B | 180 | 116 |
| IV-A | 27 | 7 |
| IV-B | 41 | 19 |
| V-A | 14 | 5 |
| V-B | 100 | 48 |

Example 6

100 parts each of the commercial wetting agent Aerosol OT (Young and Coons, l. c., p. 117) are mixed:

A. With 20 parts of water and 20 parts of tributyl phosphate,
B. with 40 parts of water.

For testing the wetting power 0.5 gram of each of the mixtures A and B were dissolved in 1 litre each of water and the sinking times of cotton and wool measured in these solutions at 20° C. in the way described in Example 1. The obtained results are as follows:

|  | Sinking times | |
|---|---|---|
|  | Cotton, 0.5 g./litre | Wool, 0.5 g./litre |
|  | Seconds | Seconds |
| A | 5 | 4 |
| B | 8 | 10 |

Example 7

100 parts of the commercial wetting agent Areskap 100 (Young and Coons, l. c., p. 119) are mixed with:

A. 20 parts of water and 20 parts of tributyl phosphate and
B. 40 parts of water.

For testing the wetting power 2 grams of each of the mixtures A and B were dissolved in 1 litre each of water and the sinking times of cotton and wool measured in these solutions at 20° C. in the way described in Example 1. The obtained results are as follows:

|  | Sinking times | |
|---|---|---|
|  | Cotton, 2 g./litre | Wool, 2 g./litre |
|  | Seconds | Seconds |
| A | 2 | 2 |
| B | 26 | 18 |

Example 8

500 parts each of a paste containing 320 parts of the technical pure sodium salt of a dodecyltoluene sulfonic acid and 180 parts of water are mixed in a suitable apparatus with tributoxyethylphosphate and water as follows:

|  | A | B | C | D | E |
|---|---|---|---|---|---|
| Paste of the sodium salt of dodecyltoluene sulfonic acid......parts.. | 500 | 500 | 500 | 500 | 500 |
| Water......do.... | 20 | 45 | 70 | 88 | 120 |
| Tributoxyethylphosphate......do.... | 100 | 75 | 50 | 32 |  |
| Total......do.... | 620 | 620 | 620 | 620 | 620 |
| Percentage of tributoxyethylphosphate calculated on dry sulfonate......percent.. | 31 | 23 | 15.5 | 10 | 0 |

For testing the wetting power 1 gr. and 0.5 gr. each of the pastes A–E were dissolved in 1 liter each of water and the sinking times of cotton and wool measured in these solutions at 20° C. as defined in Example 1. The obtained results are as follows:

|  | Sinking Times | | | |
|---|---|---|---|---|
|  | Cotton | Wool | Cotton | Wool |
|  | 1 g./l. | | 0.5 g./l. | |
|  | Seconds | Seconds | Seconds | Seconds |
| Mixture A | 3 | 5.5 | 10 | 16.5 |
| Mixture B | 4.5 | 7.5 | 13.5 | 17.5 |
| Mixture C | 5.5 | 11 | 20 | 21 |
| Mixture D | 10 | 15 | 27.5 | 32.5 |
| Mixture E | 21 | 33 | 60 | 70 |

The technical pure sodium salt of dodecyltoluene sulfonic acid used in this example may be obtained by sulfonation of dodecyltoluene with 20% oleum at 25° C. When the sulfonation is finished the sulfonate mass is diluted carefully with ice (approximately 45% of the weight of 20% oleum employed for the sulfonation). After standing overnight the mass separates in two layers. The lower layer consisting of dilute sulfuric acid is drained and the upper layer is neutralised under cooling with a 30% caustic soda solution. The paste obtained in this manner contains approximately 36% of water and 8.5% of sodium sulfate and constitutes technical pure sulfonate.

What I claim is:

1. A wetting agent consisting essentially of a mixture of at least one water-soluble salt of an alkyl-aryl-sulfonic acid and of at least one substantially water-insoluble triester of phosphoric acid selected from the group consisting of trialkyl phosphates and trialkoxyalkyl phosphates, the alkyl radicals of which contain 3 to 8 carbon atoms, the quantity of phosphoric acid triester present amounting to 10 to 40% by weight relative to the said salt.

2. A wetting agent consisting essentially of a mixture of at least one water-soluble salt of an alkylbenzene sulfonic acid and of at least one substantially water-insoluble triester of phosphoric acid selected from the group consisting of trialkyl phosphates and trialkoxyalkyl phosphates, the alkyl radicals of which contain 3 to 8 carbon atoms, the quantity of phosphoric acid triester present amounting to 10 to 40% by weight relative to the said salt.

3. A wetting agent consisting essentially of a mixture of at least one water-soluble salt of an alkylnaphthalene sulfonic acid and of at least one substantially water-insoluble triester of phosphoric acid selected from the group consisting of trialkyl phosphates and trialkoxyalkyl phosphates, the alkyl radicals of which contain 3 to 8 carbon atoms, the quantity of phosphoric acid triester present amounting to 10 to 40% by weight relative to the said salt.

4. A wetting agent consisting essentially of a mixture of at least one water-soluble salt of dodecyltoluene sulfonic acid and of at least one substantially water-insoluble triester of phosphoric acid selected from the group consisting of trialkyl phosphates and trialkoxyalkyl phosphates, the alkyl radicals of which contain 3 to 8 carbon atoms, the quantity of phosphoric acid triester present amounting to 10 to 40% by weight relative to the said salt.

5. A wetting agent consisting essentially of a mixture of at least one salt of nonyl-naphthalene sulfonic acid and of at least one substantially water-insoluble triester of phosphoric acid selected from the group consisting of trialkyl phosphates and trialkoxyalkyl phosphates, the alkyl radicals of which contain 3 to 8 carbon atoms, the quantity of phosphoric acid triester present amounting to 10 to 40% by weight relative to the said salt.

6. A wetting agent consisting essentially of a mixture of at least one water-soluble salt of an alkyl-aryl sulfonic acid and of tributyl phosphate, the quantity of the latter present amounting to 10 to 40% by weight relative to the said salt.

7. A wetting agent consisting essentially of a mixture of at least one water-soluble salt of an alkyl-aryl sulfonic acid and of tributoxyethyl phosphate, the quantity of the latter present amounting to 10 to 40% by weight relative to the said salt.

8. A wetting agent consisting essentially of a mixture of at least one water-soluble salt of an alkyl-aryl sulfonic acid, of tributyl phosphate and of tributoxyethyl phosphate, the quantity of the latter present amounting to 10 to 40% by weight relative to the said salt.

9. A wetting agent consisting essentially of a mixture of at least one water-soluble salt of the nonylnaphthalene sulfonic acid and of tributyl phosphate, the quantity of the latter present amounting to 10 to 40% by weight relative to the said salt.

10. A wetting agent consisting essentially of a mixture of at least one water-soluble salt of the nonyl-naphthalene sulfonic acid and of tributoxyethyl phosphate, the quantity of the latter present amounting to 10 to 40% by weight relative to the said salt.

11. A wetting agent consisting essentially of a mixture of at least one water-soluble salt of the dodecyltoluene sulfonic acid and of tributyl phosphate, the quantity of the latter present amounting to 10 to 40% by weight relative to the said salt.

12. A wetting agent consisting essentially of a mixture of at least one water-soluble salt of the dodecyltoluene sulfonic acid and of tributoxyethyl phosphate, the quantity of the latter present amounting to 10 to 40% by weight relative to the said salt.

13. A wetting agent consisting essentially of a mixture of at least one water-soluble salt of the dodecyltoluene sulfonic acid, of tributyl phosphate and of tributoxyethyl phosphate, the quantity of phosphates present amounting to 10 to 40% by weight relative to the said salt.

14. The method of enhancing the wetting-out capacity of a wetting agent consisting essentially of at least one water-soluble salt of the nonyl-naphthalene sulfonic acid, which comprises admixing the said wetting agent with tributyl phosphate, the quantity of the latter present amounting to 10 to 40% by weight relative to the said wetting agent.

15. The method of enhancing the wetting-out capacity of a wetting agent consisting essentially of at least one water-soluble salt of the nonyl-naphthalene sulfonic acid which comprises admixing the said wetting agent with tributoxyethyl phosphate, the quantity of the latter present amounting to 10 to 40% by weight relative to the said wetting agent.

16. The method of enhancing the wetting-out capacity of a wetting agent consisting essentially of at least one water-soluble salt of the dodecyltoluene sulfonic acid which comprises admixing the said wetting agent with tributyl phosphate, the quantity of the latter present amounting to 10 to 40% by weight relative to the said wetting agent.

17. The method of enhancing the wetting-out capacity of a wetting agent consisting essentially of at least one water-soluble salt of the dodecyltoluene sulfonic acid which comprises admixing the said wetting agent with a mixture consisting of tributyl phosphate and tributoxyethyl phosphate, the quantity of the said mixture present amounting to 10 to 40% by weight relative to the said wetting agent.

References Cited in the file of this patent

UNITED STATES PATENTS 2,469,377    Flett    May 10, 1949

FOREIGN PATENTS 538,408    Great Britain    Aug. 1, 1941